Patented Apr. 14, 1942

2,279,469

UNITED STATES PATENT OFFICE 2,279,469

PROCESS OF MAKING OLEFIN OXIDES

George H. Law, South Charleston, and Henry C. Chitwood, Charleston, W. Va., assignors to Carbide and Carbon Chemicals Corporation, a corporation of New York No Drawing. Application April 12, 1938, Serial No. 201,514

11 Claims. (Cl. 260—348)

This invention is an improvement in the process disclosed by T. E. Lefort in Reissue Patent 20,370 for making olefin oxides by the direct chemical combination of olefins with molecular oxygen in the presence of surface catalysts at temperatures of about 150° to about 400° C. Broadly, the improvement comprises a method of increasing the yields of olefin oxide in Lefort's process by retarding complete oxidation of the olefin by means of the presence of controlled small amounts of anti-catalytically acting substances, all as more fully hereinafter described. The advantages and value of this will be apparent.

Lefort has shown that two main reactions occur in the direct oxidation of olefins to form olefin oxides. Using ethylene for illustration, these are:

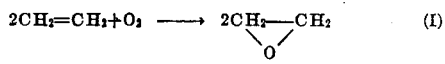

and

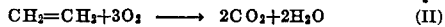

Reaction II represents the oxidation completely of ethylene to carbon dioxide and water, and it is possible that secondary oxidation of some olefin oxide may occur also to give these ultimate products. It is immaterial which course is followed, and by "complete oxidation" we refer to either or both of these reactions which give rise to the ultimate products, carbon dioxide and water.

In any case, conduct of Lefort's process gives rise to the formation of some carbon dioxide, as well as the desired olefin oxide, and it will be evident that the chemical efficiency in the Reaction I is a direct function of the extent to which the formation of carbon dioxide can be avoided or suppressed. Excessive production of carbon dioxide also is undesirable because it renders temperature control in the process extremely difficult, since the heat evolved in Reaction II is approximately ten times that developed by Reaction I. The temperature in the process must be rather carefully controlled to avoid local overheating of the catalyst, which not only results in still greater production of carbon dioxide, but may also adversely affect the activity of the catalyst.

The addition of water or carbon dioxide, or both, to the reacting gases for the purpose of checking the complete oxidation of ethylene and thereby increasing the yield of ethylene oxide has been described by Lefort. It was also stated that the addition of hydrogen serves a similar beneficial purpose. Whether these gases when added to the reactants improve the process by acting as heat-absorbing diluents or by exerting some less apparent effect is not known, but both our own observations and those recorded by Lefort have made clear the fact that these substances exert no effect except when used in substantial proportions. For example, less than 5% by volume of water, carbon dioxide or hydrogen is practically without effect on the process, and minute quantities of the order of, say, 0.1% of the reactants have utterly no effect on the yield of ethylene oxide.

According to our invention, the reaction of olefins with molecular oxygen directly to form olefin oxides in the presence of surface catalysts is regulated by incorporating with the reactants very small controlled amounts of volatile materials, which probably are preferentially adsorbed on the surface of the catalyst. The amount of these materials added must be carefully controlled, and it is always extremely small with respect to the volume of reactants, usually less than 0.1% of the total volume. There seems to be no doubt that these substances act by affecting the activity of the surface catalyst itself, since their effect may persist for hours, or even several days, after their introduction to the reactants has been discontinued. This would, of course, not be the case with any substance which functioned only in the homogeneous gas phase. The degree to which the catalyst is affected depends both on the nature of the catalyst and on the amount and type of the additional substance introduced. As has been stated, these materials apparently are selectively adsorbed on the surface of the catalyst, although they may in some cases react to form addition compounds with the constituents of the catalyst. The exact mechanism by which they function is unknown, and it is to be understood that this invention is not limited by or restricted to any theory of action expressed herein.

In general, compounds falling into five classes may serve as the anti-catalysts of this invention, and, so far as we have been able to find, any substances in these classes may be used provided that they are within the volatility limits hereinafter specified and are used in carefully controlled amounts as set forth below. The classes are: halogens and compounds containing halogens; hydrocarbons; compounds containing carbon, hydrogen and oxygen; compounds containing sulfur; and compounds containing nitrogen. In this connection it must be emphasized that elemental nitrogen is not included in the group of anti-catalytically acting materials. This application is directed specifically to materials from the above classes which comprise halogens and compounds containing halogens, compounds containing sulfur, and mixtures of these with hydrocarbons. Materials from others of the classes named are the subject of our application Serial No. 296,492, filed September 25, 1939. There follows a list of specific substances which have been tested and found useful in accordance with this invention:

| | |
|---|---|
| Chlorine | Tetraethylene glycol dibutyl ether |
| Ethylene dichloride | |
| Hydrochloric acid | Pentaethylene glycol dibutyl ether |
| Dichlorethyl ether | |
| Chlorobenzene | Ethylene glycol monoethyl ether |
| Carbon tetrachloride | |
| Ethylene dibromide | Anisole |
| Propyl bromide | Sulfur dioxide |
| p-Xylene | Sulfur trioxide |
| Benzene | Sulfur chloride |
| n-Hexane | Hydrogen sulfide |
| Tetrahydronaphthalene | Diethyl sulfide |
| Methanol | Nitric oxide |
| Ethanol | o-Nitroanisole |
| Isopropanol | Diphenyl amine |
| Acetone | Monoamyl amine |
| Methylethyl ketone | Ethylene diamine |
| Acetic acid | Ammonia |
| Isopropyl ether | Aniline |
| Dibutyl ether | o-Nitrotoluene |
| Dioxane | Morpholine ethanol |
| Triethylene glycol dibutyl ether | Dibutyl aminoethanol |
| | Naphthonitrile |

The type of additional material or anti-catalyst employed depends primarily on the activity of the catalyst. The anti-catalysts within the scope of this invention vary considerably in their action on the catalyst, some being effective in much lower concentration than others. An anti-catalyst having a relatively mild effect is ordinarily employed with a catalyst of relatively low activity, and a more effective anti-catalyst is employed when it is desired to regulate the action of a very active catalyst. In some cases, when starting the operation of the process of oxidizing olefins to form olefin oxides directly employing an active surface catalyst, it is desirable to bring the process (heat evolution) under control through the aid of a strongly acting anti-catalyst and then to continue operation with a controlling medium exerting a weaker effect.

In addition to these quantitative differences, the anti-catalysts appear to differ qualitatively in their effect on the catalyst. Some of the materials listed have a general depressing action since they decrease the amount of olefin which is oxidized and check the formation of both olefin oxide and carbon dioxide. Others are more selective and repress the production of carbon dioxide while only slightly decreasing the amount of olefin which is oxidized, so that a much higher yield of olefin oxide is obtained. The present invention is not confined to the use of only those anti-catalysts which are highly selective, since less selective materials are useful in controlling reaction temperature and preventing local overheating of the catalyst. For example, it may be in some cases more desirable to control the reaction through the aid of a relatively non-selective anti-catalyst than by dilution of the reaction gases with a large volume of inert vapors. In order to utilize various degrees of the effects noted above, it is, of course, possible to employ mixtures of the individual anti-catalyst substances.

Of the anti-catalysts which selectively repress the complete oxidation of ethylene, the halogens and halogen compounds, especially chlorine and compounds containing chlorine, are the most useful. The following is a list of some of these materials which exhibit selective anti-catalytic properties; that is, they repress the formation of carbon dioxide, but, when used in the correct concentrations, do not repress, and actually enhance the reaction to produce ethylene oxide:

Chlorine
Ethylene dichloride
Hydrochloric acid
Dichlorethyl ether
Chlorobenzene
Carbon tetrachloride
Ethylene dibromide The concentration of these anti-catalysts must be very carefully controlled. If too little is used, the yield is low due to the excessive reaction to produce carbon dioxide. The heat evolved in this undesirable reaction renders temperature control difficult, and there is danger of overheating and deactivation of the catalyst. When small amounts of one of these anti-catalysts are added to the reaction gas mixture, the production of ethylene oxide increases with increase in concentration of anti-catalyst, and the complete oxidation is at the same time suppressed. When the maximum production rate is attained, further increases in anti-catalyst concentration suppress both reactions simultaneously, and the rate of production of ethylene oxide declines. The chemical efficiency, that is, the molecular ratio of ethylene oxide produced to ethylene consumed, increases rapidly with the addition of small amounts of anti-catalyst and then more slowly as both reactions are inhibited.

The exact amount of anti-catalyst needed to produce the desired effect depends on the activity of the catalyst and the conditions of temperature and feed rate of reactant and diluent gases, and on the anti-catalyst employed. For any given set of conditions, however, there is a definite amount of anti-catalyst which will give a maximum production rate, and the concentration or average rate of introduction of the anti-catalyst must be controlled within narrow limits to maintain this rate. The use of less anti-catalyst than this is always disadvantageous since both the production rate and chemical efficiency are in such a case lower than those resulting from the use of slightly more anti-catalyst. The use of slightly more anti-catalyst than is necessary for the maximum production rate is sometimes justified because of the better chemical efficiency thus obtainable. This excess of anti-catalyst which can be justified is always very small, however, since larger amounts rapidly reduce the production rate and do not greatly increase the chemical efficiency. In general, the continued use of double the proper amount of halogenated anti-catalyst will result in reducing the production to practically nothing. For this reason, amounts even slightly in excess of those required to give the desired results should be carefully avoided. Another reason is that the deactivating effect produced on a catalyst by a halogen-containing anti-catalyst is of long duration and may continue for several days or in some cases permanently. In no case should the average concentration of anti-catalyst for any appreciable period of time exceed 0.1% by volume of the gas admitted to the catalyst, although higher concentrations used intermittently for very short periods of time produce an effect similar to that of continued use at small concentration. Fresh catalysts usually require the largest amounts of anti-catalyst. Halogenated anti-catalysts in concentrations as high as 0.1% have been used with freshly prepared catalysts, but after a relatively short period of operation a smaller concentration is used. It is desirable to admit the anti-catalyst at a constant rate in minute concentration to permit smoothest operation.

Hydrocarbons, such as xylene, benzene, and hexane, are useful in controlling the activity of catalysts. In general, their action is not selective with freshly prepared catalysts, but in small concentrations they aid in preventing excess burning of ethylene and thereby facilitate operation by aiding in temperature control and preventing deactivation of the catalyst by overheating. The action of the hydrocarbon is not of long duration as is that of the halogens or halogen-containing compounds, and they may be used more freely than the latter and without as great danger of deactivation of the catalyst in the event of an accidental overdose. The anti-catalytic action of hydrocarbons does not, in general, increase in proportion to their concentration beyond 0.1%. In fact, when used in higher concentrations, their action as far as heat control is concerned becomes reversed, for the reason that the anti-catalytic hydrocarbons burn under ordinary reaction conditions. Thus, benzene burns to form carbon dioxide and water, a strongly exothermic reaction, so that the oxidation of 0.1% by volume of benzene vapor evolves as much heat as the oxidation of about 3% by volume of ethylene to ethylene oxide. For this reason, the concentration of hydrocarbon anti-catalysts must be controlled to small amounts in order to effect the purpose of the invention.

The hydrocarbon anti-catalysts, while they may be used alone, are best used in conjunction with the more selective anti-catalysts. When used alone, over catalysts of low activity, or over those which have been previously operated in the presence of halogenated anti-catalysts, they often exhibit selective action in the desired direction.

Compounds containing carbon, hydrogen, and oxygen are useful anti-catalysts, and, in general, they are more selective in their action than the hydrocarbons. The effects of these compounds are usually more permanent than those produced by the hydrocarbons but less permanent than those of the halogenated materials. As a class, these compounds in concentrations greater than 0.1% by volume exhibit the effects both of the hydrocarbons and of the halogen-containing anti-catalysts, and they should not be used in greater concentrations.

Compounds containing sulfur are effective when used in small amounts. Sulfur trioxide and hydrogen sulfide are selective in their action, the former being particularly useful in suppressing the complete oxidation of ethylene. Sulfur compounds should be used only in minute quantities because of their permanent deleterious action on the catalyst when used in larger amounts.

Compounds containing nitrogen, but not elementary nitrogen, are useful anti-catalysts. Certain members of the class, such as o-nitroanisole, diphenyl amine, and aniline, produce a selective retardation of complete oxidation, but, in general, the nitrogen compounds are relatively non-selective. Here again, the concentrations must be kept low to avoid deactivation of the catalysts which results from amounts in excess of about 0.1%.

The anti-catalysts may be added to the reaction gases in any manner which insures a uniform rate of addition and uniform distribution of the material throughout the gases entering the catalyst chamber. For example, those materials which are gases at ordinary temperatures may be fed through a flow meter, while those which are liquids may be volatilized and similarly admitted to the gases. Also, it is possible to introduce the desired amount of a liquid in vapor form by passing through it a portion of the reaction gases, or a suitable inert gas, at a rate sufficient to produce in the total inlet gases the desired concentration of material.

The preferred anti-catalysts are liquids and we prefer to add them in the manner last mentioned above, holding the liquid at approximately room temperature. Under these conditions we have found that substances having boiling points above about 350° C. at atmospheric pressure are not sufficiently volatile to be useful. Thus, substances having about the volatility of pentaethylene glycol dibutyl ether (boiling at 190° C. at a pressure of 3 mm. of mercury) are the least volatile that can be conveniently employed in our invention. Somewhat less volatile materials may be used if they are heated as the gas is passed through them, but we prefer to use materials of sufficient volatility so that heating is unnecessary. Very high boiling materials, such as lubricating oil and sodium chloride, have been found to have anti-catalytic effects corresponding to the classes of hydrocarbons and of chlorine compounds, respectively, when introduced in liquid or dissolved form, but such a method of application is not practical for exact control and continuous operation. Therefore, we recommend restriction to substances which are volatile at the reaction temperature so that they may be applied in the gaseous or vapor form. In the case of hydrocarbons, which are less active anti-catalysts than the other classes, we have not obtained satisfactory anti-catalytic action from any boiling above about 250° C. at atmospheric pressure, probably because of lack of sufficient vapor. Also we have not found any to be suitable which boil below about 70° C. The very volatile hydrocarbons either seem to be unadsorbed and unaffected at reaction conditions, as is the case with ethane, or they oxidize rapidly, as is the case with acetylene, in either case without anti-catalytic effect. The substances containing carbon, hydrogen, and oxygen are more effective than the hydrocarbons, and substances of this class having boiling points between about 35° and about 350° C. may be used. Halogens and compounds containing halogens, nitrogen and sulfur appear to be useful provided they have appreciable volatility at the temperature of the reaction.

The effect of the anti-catalysts of this invention on the process of forming olefin oxides by the direct oxidation of olefins with molecular oxygen in the presence of surface catalysts will be illustrated by the following examples. In all cases the air and ethylene used were obtained from supplies which were originally free from anti-catalytic materials or which were freed from such materials by known means of purification. Activated carbon conveniently removes all but a few of the most volatile anti-catalysts, and these can be removed by various means according to their nature. From what has been said, it will be obvious that the presence of uncontrolled amounts, even of the order of a few hundredths of a per cent, of anti-catalytic materials in the air or ethylene would be highly prejudicial to the results.

Example 1

A catalyst was prepared by evaporating to dryness an aqueous mixture of 25 grams of silver oxide, 2.5 grams of barium peroxide and 200 cc. of porous artificial silica stone crushed and sized between 4 and 8 mesh screens. The catalyst chamber consisted of a 1 inch steel tube which contained a section of 0.125 inch tubing extending 30 inches from its exit end. The inner tube served as a thermocouple well, and the catalyst was placed in the annular space between the inner and outer tubes. A section of the tube in advance of the space filled with catalyst was packed with untreated granular silica stone to serve as a preheater. The tube was heated over 36 inches of its length.

A mixture of air and ethylene containing 10% ethylene was admitted to the catalyst tube at the rate of 56 liters per hour. The temperature of the catalyst was gradually increased to between 290° and 295° C. Under these conditions, 65% of the ethylene introduced was reacted. Approximately 9% of the ethylene which reacted was converted to ethylene oxide, and the remaining 91% was converted to carbon dioxide and water. A small amount of ethylene dichloride was then introduced with the reactant gases by bubbling nitrogen through liquid ethylene dichloride at room temperature and feeding the resulting mixture to the catalyst tube. In this way the amount of ethylene dichloride vapor introduced was equal to about 0.05% of the total volume of gases, or a ratio of ethylene dichloride to ethylene of about 0.02 by weight. At a temperature between 290° and 300° C., 68% of the total ethylene introduced was reacted. About 60% of the ethylene which reacted was converted to ethylene oxide and the remaining 40% to carbon dioxide and water.

Example 2

The catalyst chamber was the same as that described in Example 1, and the catalyst was prepared by evaporating to dryness an aqueous mixture of 79 grams of silver oxide and 200 cc. of artificially bonded aluminum oxide sized between 4 and 8 mesh screens. The rate of feed and the composition of the inlet gas were the same as in the previous example.

Under these conditions and at a temperature of 194° C., approximately 48% of the ethylene admitted was reacted. It was found that of the ethylene which reacted 46% was converted to ethylene oxide and the remainder to carbon dioxide and water. A small amount of xylene was then introduced to the reactant gases by the same method employed in Example 1. Sufficient xylene was introduced to amount to approximately 0.01% of the inlet gases, or a ratio of xylene to ethylene of 0.004 by weight. The temperature of the catalyst was gradually increased, and at a temperature of 240° C., 58% of the ethylene was reacted, of which 67% was converted to ethylene oxide and the remainder to carbon dioxide and water.

The surface catalysts with which the anti-catalyst materials of this invention are effective may be those essentially composed of silver or of silver activated by various added materials, such as the alkali metal and alkaline earth metal peroxides, hydroxides and oxides. These silver surface catalysts may be used in any convenient form, whether disposed on inert supporting materials or otherwise contained in the reaction chamber. The present invention is applicable to the direct oxidation of olefins, especially ethylene, to form olefin oxides (ethylene oxide) when this reaction is conducted in accordance with any of the known methods of putting it into effect.

Modifications of the process will be apparent and are included within the invention as defined by the appended claims.

This application contains subject matter in common with our application Serial No. 157,884, filed August 7, 1937.

We claim:

1. Process of making olefin oxides by the direct chemical combination of olefins with molecular oxygen in the presence of active silver surface catalysts at temperatures between about 150° and about 400° C., which comprises supplying olefins and molecular oxygen to said process and repressing the complete oxidation of the olefin by adding to at least one of the reactants controlled and very small amounts of at least one material selected from the group consisting of halogens and compounds containing halogens boiling below about 350° C., compounds containing sulfur boiling below about 350° C., and mixtures of the foregoing with hydrocarbons boiling between about 70° and about 250° C., the amount of total repressant material being less than about 0.1% of the total volume of gases comprising the reactants.

2. Process of making olefin oxides by the direct chemical combination of olefins with molecular oxygen in the presence of active silver surface catalysts at temperatures between 150° and about 400° C., which comprises supplying olefins and molecular oxygen to said process and repressing the complete oxidation of the olefin by adding to at least one of the reactants controlled and very small amounts of substances of the group consisting of halogens and halogen-containing compounds boiling below about 350° C., the amount of said substances present being less than about 0.10% of the total volume of gases comprising the reactants.

3. Process of making olefin oxides by the direct chemical combination of olefins with molecular oxygen in the presence of active silver surface catalysts at temperatures between about 150° and about 400° C., which comprises supplying olefins and molecular oxygen to said process and repressing the complete oxidation of the olefin by adding to at least one of the reactants controlled and very small amounts of substances of the group consisting of chlorine and chlorine-containing compounds boiling below about 350° C., the amount of said substances present being less than about 0.10% of the total volume of gases comprising the reactants.

4. Process of making olefin oxides by the direct chemical combination of olefins with molecular oxygen in the presence of active silver surface catalysts at temperatures between about 150° and about 400° C., which comprises supplying olefins and molecular oxygen to said process and repressing the complete oxidation of the olefin by adding to at least one of the reactants controlled and very small amounts of chlorinated hydrocarbons boiling below about 350° C., the amount of said chlorinated hydrocarbons present being less than about 0.10% of the total volume of reactants.

5. Process of making olefin oxide by the direct chemical combination of olefins with molecular oxygen in the presence of active silver surface catalysts at temperatures between about 150° and about 400° C., which comprises supplying olefins and molecular oxygen to said process and repressing the complete oxidation of the olefin by adding to at least one of the reactants controlled and very small amounts of ethylene dichloride not exceeding about 0.10% of the total volume of gases comprising the reactants.

6. Process of making ethylene oxide by the direct chemical combination of ethylene with molecular oxygen in the presence of active silver surface catalysts at temperatures between about 150° and about 400° C., which comprises supplying ethylene and molecular oxygen to said process and repressing the complete oxidation of the ethylene by adding to at least one of the reactants controlled and very small amounts of at least one material selected from the group consisting of halogens and compounds containing halogens boiling below about 350° C., compounds containing sulfur boiling below about 350° C., and mixtures of the foregoing with hydrocarbons boiling between about 70° and about 250° C., the amount of total repressant material being less than about 0.1% of the total volume of gases comprising the reactants.

7. Process of making ethylene oxide by the direct chemical combination of ethylene with molecular oxygen in the presence of an active silver surface catalyst at temperatures between 150° and about 400° C., which comprises supplying ethylene and molecular oxygen to said process and repressing the complete oxidation of the ethylene and increasing the yield of ethylene oxide by adding to at least one of the reactants controlled and very small amounts of substances of the group consisting of halogens and halogen-containing compounds boiling below about 350° C., the amount of said substances present being less than about 0.10% of the total volume of gases comprising the reactants.

8. Process of making ethylene oxide by the direct chemical combination of ethylene with molecular oxygen in the presence of an active silver surface catalyst at temperatures between about 150° and about 400° C., which comprises supplying ethylene and molecular oxygen to said process and repressing the complete oxidation of the ethylene and increasing the yield of ethylene oxide by adding to at least one of the reactants controlled and very small amounts of substances of the group consisting of chlorine and chlorine-containing compounds boiling below about 350° C., the amount of said substances present being less than about 0.10% of the total volume of gases comprising the reactants.

9. Process of making ethylene oxide by the direct chemical combination of ethylene with molecular oxygen in the presence of an active silver surface catalyst at temperatures between about 150° and about 400° C., which comprises supplying ethylene and molecular oxygen to said process and repressing the complete oxidation of the ethylene and increasing the yield of ethylene oxide by adding to at least one of the reactants controlled and very small amounts of chlorinated hydrocarbons boiling below about 350° C., the amount of said chlorinated hydrocarbons present being less than about 0.10% of the total volume of gases comprising the reactants.

10. Process of making ethylene oxide by the direct chemical combination of ethylene with molecular oxygen in the presence of an active silver surface catalyst at temperatures between about 150° and about 400° C., which comprises supplying ethylene and molecular oxygen to said process and repressing the complete oxidation of the ethylene and increasing the yield of ethylene oxide by adding to at least one of the reactants controlled and very small amounts of ethylene dichloride not exceeding about 0.10% of the total volume of gases comprising the reactants.

11. Process of making ethylene oxide by the direct chemical combination of ethylene with molecular oxygen in the presence of an active silver surface catalyst at temperatures between about 150° and about 400° C., which comprises supplying ethylene and molecular oxygen to said process and repressing the complete oxidation of the ethylene and increasing the yield of ethylene oxide by adding to at least one of the reactants controlled and very small amounts of a mixture of xylene and ethylene dichloride not exceeding about 0.10% of the total volume of gases comprising the reactants.

GEORGE H. LAW.
HENRY C. CHITWOOD.